United States Patent [19]

Riollet

[11] Patent Number: 4,628,693
[45] Date of Patent: Dec. 16, 1986

[54] CASING FOR DISTRICT HEATING TURBINE

[75] Inventor: Gilbert Riollet, Paris, France
[73] Assignee: Alsthom-Atlantique, Paris, France
[21] Appl. No.: 706,992
[22] Filed: Feb. 28, 1985
[30] Foreign Application Priority Data Mar. 1, 1984 [FR] France ................................ 84 03230

[51] Int. Cl.$^4$ ............................................. F01K 17/02
[52] U.S. Cl. ......................................... 60/648; 60/677
[58] Field of Search ................................ 60/648, 677

[56] References Cited

U.S. PATENT DOCUMENTS 4,170,879 10/1979 Laing et al. ............................ 60/677
4,492,084 1/1985 Spliethoff ............................ 60/648

FOREIGN PATENT DOCUMENTS 203354 10/1983 German Democratic Rep. ... 60/648

Primary Examiner—Allen M. Ostrager
Attorney, Agent, or Firm—Sughrue, Mion, Zinn, Macpeak, and Seas

[57] ABSTRACT

IP or HP casing for a turbine designed for cogeneration of electric power and heat for district heating purposes, comprising blades carried by a rotor (31) rotating in a stator (32), an inlet steam admission (8'), two exhausts (12' and 17') at different pressures $p_1$ and $p_2$ ($p_2 > p_1$) feeding a LP section (4) of the turbine, and two further exhausts (15', 20') at pressures $p_1$ and $p_2$ feeding two district heating heat exchangers (22, 23) arranged in series, each of said exchangers providing substantially half of the heating output. Turbine efficiency is improved by providing a single flow (27) from the steam inlet (8'), which is then split into two partial flows (28) with substantially equal steam flow rates as of a flow-splitting point located far enough from the two exhausts at pressure $p_2$ (17', 20') so that changes in flow rates have little or no effect on the steam pressure at said flow-splitting point.

4 Claims, 4 Drawing Figures

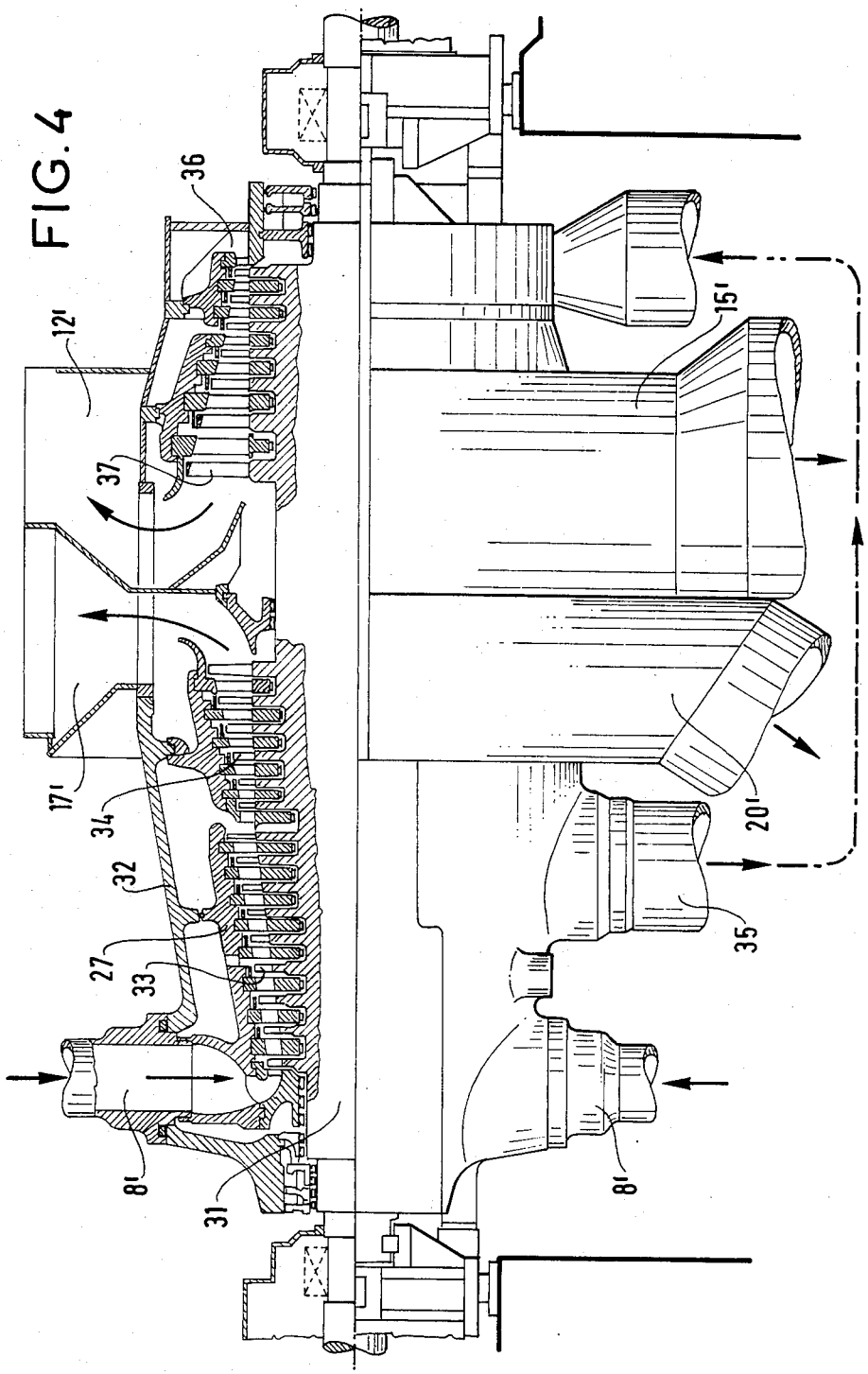

CASING FOR DISTRICT HEATING TURBINE

This invention relates to an IP or HP casing for a turbine designed for cogeneration of electric power and heat for district heating purposes and comprising buckets or blades carried by a rotor rotating inside a stator, an inlet steam admission, two exhausts at different pressures $p_1$ and $p_2$ ($p_2 > p_1$) feeding a LP section of the turbine and two exhausts at pressures $p_1$ and $p_2$ to supply two district heating heat exchangers arranged in series, each of said exchangers providing substantially half of the heating output.

BACKGROUND OF THE INVENTION

Such a turbine casing is described in an article entitled, "Steam Turbines in Conventional Combined District Heating and Power Stations," by Helmut Muhlhauser, in Brown Boveri Review No. 9, 1977, pp. 536–549 (see especially FIGS. 12g, 21, 22).

In the prior art turbine, the IP casing is non-symmetrical, with double flow, and the steam path is divided into two streams on entering the IP casing. Each outflow from this casing is at a different pressure. The two partial steam flows remain independent of one another until reaching the condenser, which is connected to the exhaust of the LP section.

Steam distribution between the LP section supply and the heat exchanger supplies is automatically controlled by means of butterfly valves installed in the exhausts feeding the LP section and control bypasses arranged in parallel in the exchangers' water system, so that both exchangers provide the same amount of power and that the water having passed through the two exchangers has the desired temperature.

Indeed, it is important for purposes of efficiency that each exchanger provide approximately the same heating power to the district heating water. The efficiency obtained with the prior art turbine is good. However, even a small further improvement in efficiency leads to a substantial energy saving when the entire life of the machine is considered.

SUMMARY OF THE INVENTION

The turbine casing according to the invention, providing improved efficiency, features a single flow from its steam inlet which splits into two partial flows receiving substantially equal steam flow rates, said flow-splitting point being established far enough from the exhausts at pressure $p_2$ so that changes in flow rates have little or no effect on the steam pressure at said flow-splitting point.

The efficiency of the turbine casing according to the invention is better than that of the current state-of-the-art design because part of the steam path is single-flow.

Preferably, the flow-splitting point is selected such that, for an inlet pressure equal to its rated value, the pressure at the splitting point is greater than $1.8/x$ times the saturation pressure corresponding to the rated temperature of the water supplied to the district heating system, x being the ratio of the minimum heating output to its maximum back-pressure value.

To make the turbine casing easier to build and to balance the thrusts involved, the casing is configured so that the two partial steam flows follow opposed axial paths.

BRIEF DESCRIPTION OF THE DRAWINGS

The present invention will be more readily understood in reading the following description, with reference to the accompanying drawings in which:

FIG. 4 is a detailed drawing of the turbine casing according to the invention.

DESCRIPTION OF THE PREFERRED EMBODIMENT

Figure 1:
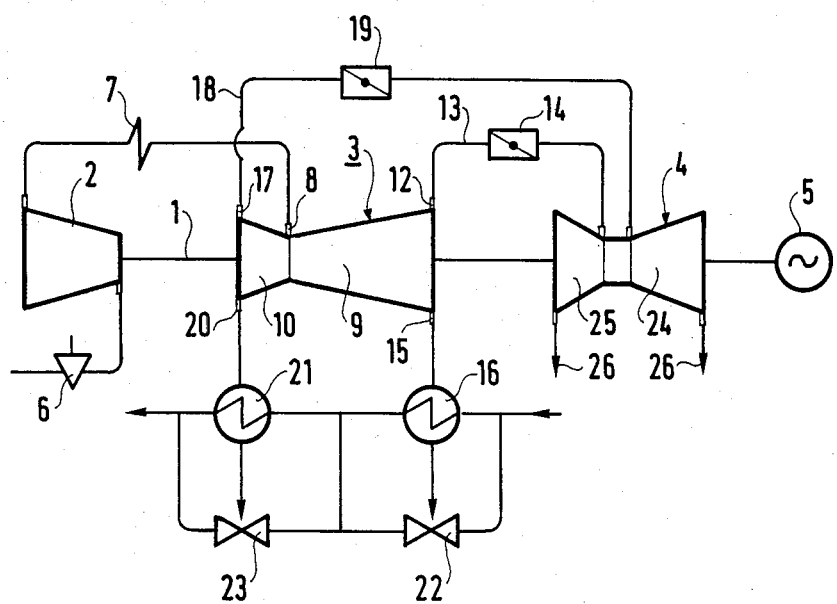
FIG. 1 is a diagram of a state-of-the-art turbine.

The prior art turbine, as illustrated in FIG. 1, comprises a shaft 1 on which are fitted a HP casing 2, an IP casing 3, a LP casing 4 and an AC generator 5. A steam admission valve 6 serves to adjust the flow of steam admitted to the inlet of the HP casing 2. The steam leaving HP casing 2 flows through the heater 7 where it is resuperheated and is then applied to the inlet 8 of the IP stage 3.

Said IP casing 3 is a double-flow design and the two half-flows 9, 10 comprising casing 3 have a different number of stages. The half-flow 9 having the most stages exhausts steam at pressure $p_1$, which is less than the pressure $p_2$ of the steam exhausted from half-flow 10.

LP casing 4 is double-flow and also comprises two half-flows 24 and 25.

Half-flow 25 has fewer stages than half-flow 24.

Half-flow 9 includes a first exhaust 12 connected via a pipe 13, provided with a bufferfly valve 14, to the admission of half-flow 25 and a second exhaust 15 feeding a first heat exchanger 16.

Half-flow 10 includes a first exhaust 17 connected via a pipe 18, provided with a bufferfly valve 19, to the admission of half-flow 24 and a second exhaust 20 feeding a second heat exchanger 21.

The exchangers 16 and 21 are arranged in series and each comprise a control bypass 22, 23. The district heating ouput water enters the inlet of exchanger 16 at a temperature $t_1$ and leaves the exchanger at an average temperature $t_m$. At the outlet of exchanger 21 it leaves at temperature $t_2$ (where $t_m = (t_1 + t_2)/2$).

The steam at exhausts 26 of the two half-flows 24 and 25 is at the pressure of the condenser. The steam flow rate is substantially the same in both half-flows 9 and 10. Opening of valves 14 and 19 and of bypasses 22 and 23 is automatically controlled so that $t_2$ has the desired value and $t_m = (t_1 + t_2)/2$.

Valves 14 and 19 are always actuated at the same time, as are bypasses 22 and 23, such that the flow rate through exhaust 12 equals that through exhaust 17 and the flow rate through exhaust 15 equals that through exhaust 20.

The operation of the turbine can be illustrated using a $Q_{cu}$, W diagram (see FIG. 2) where W stands for the quantity of energy used to produce electric power and $Q_{cu}$ stands for the energy used to provide district heating.

When the boiler is operating at maximum power and valves 14 and 19, as well as bypasses 22 and 23, are open, all of the steam produced is utilized for electricity generation. Let A be this operating point, such that $Q_{cu} = 0$, $W = W_A$.

With the boiler still operating a maximum power, but with valves 14 and 19 and bypasses 22 and 23 closed, the maximum amount of energy is then utilized for distinct heating $Q_B$; the energy utilized for electricity generation is then $W_B$; let B be this operating point, such that $Q_{cu}=Q_B$, $W=W_B$. This mode of turbine operation is termed back-pressure operation.

When the boiler is operating at maximum power with valves and bypasses open (point A) and one begins to close the bypasses while keeping the valves open, the boiler remaining at maximum output, this corresponds to line segment Ac of line AB on the diagram.

At operating point C ($Q_c$, $W_c$), the bypasses are closed and the valves 14, 19 are open.

If one begins to close the valves 14, 19, the output corresponds to line segment CB.

When boiler output is at a minimum ($P_m$), this corresponds to line segment A'B', which is parallel to AB, with A' on OA and B' to OB.

For an intermediate boiler output ($P_i$), line segment A"B" is drawn, parallel to AB, with A" on OA and B" on OB.

Points C' and C", corresponding to a situation where at boiler outputs $P_m$ and $P_i$ the bypasses are open and the valves closed, are aligned with point C. (For some turbines it is possible that CC" never meet A'B', hence that there be no point C'.)

Thus, one adjusts the operating point within trapezoid AA' C'C by opening the bypasses to various extents and within trapezoid BC C'B' by opening the valves to various extents.

Figure 3:
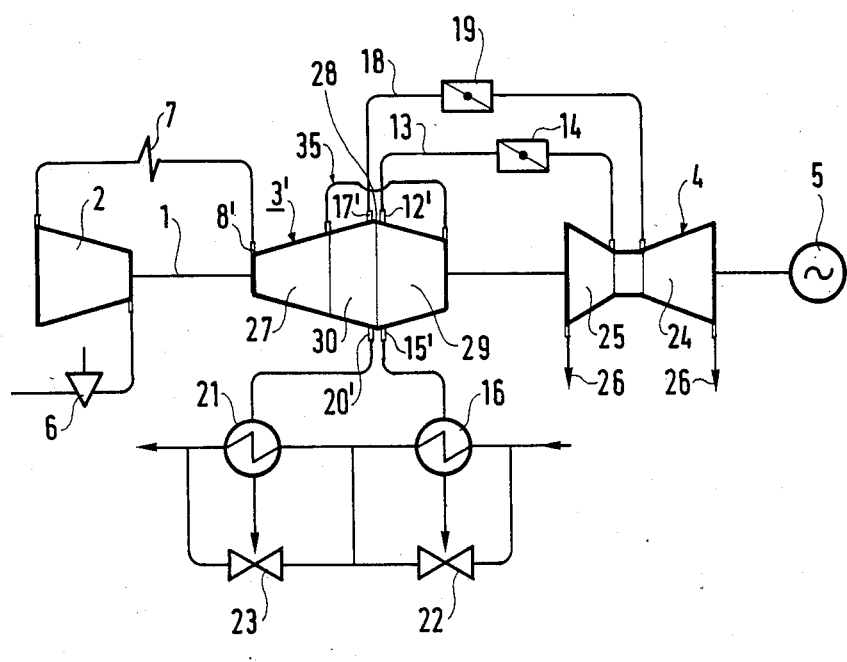
FIG. 3 is a diagram of the turbine with a casing according to the invention.

FIG. 3 shows the same diagram as in FIG. 1 in which, however, the IP casing 3 is replaced by the turbine casing 3' according to the invention. Like items bear the same references as in FIG. 1.

This casing 3' has a first, single-flow section 27 the admission 8' whereof is supplied with resuperheated steam.

The output from said first section 27 supplies a double-flow section 28 consisting of two, unsymmetrical half-flows 29 and 30.

Said half-flow 29 has more stages than half-flow 30. Half-flow 29 comprises two exhausts 12' and 15' at a pressure $p_1$, one of which is connected to valve 14 and the other to exchanger 16. Half-flow 30 comprises two exhausts 17' and 20', one of which is connected to valve 19 and the other to exchanger 21.

Exhausts 12', 17', 15' and 20' are located in the center of casing 30.

A pipe 35 connects one outlet of section 27 to the inlet of half-flow section 29.

On leaving section 27 the steam flow splits into two substantially equal flows, one supplying the half-flow 29 and the other the half-flow 30.

A detailed view, partly in cross-section and partly in perspective, of casing 3' is given in FIG. 4.

Casing 3' comprises a rotor 31 rotating in a stator 32.

The single-flow section 27 of casing 3', supplied from two inlet pipes 8', comprises nine moving stages 33. The half-flow 30 comprises six moving stages 34 mounted after the moving stages 33 of section 27 on the rotor 31.

The steam flow on leaving said stages 33 splits into two substantially equal parts, one supplying stages 34 and the other supplying, via a pipe 35, the inlet 36 of partial casing 29.

This half-flow 29 comprises seven moving stages 37 attached to rotor 31. The axial flow of the fluid in this half-flow is in a direction opposite the direction of flow of the fluid stream in section 27 and half-flow 30.

Exhausts 17' and 12' to the valves on the one hand and exhausts 15' and 20' feeding the exchangers on the other hand are disposed between stages 34 and 37.

It would be possible, by reverse-mounting the half-flow 29, to have the steam flow in the same direction through half-flow 29 and half-flow 30, however it would then be necessary to locate exhausts 12' and 15' at a distance from exhausts 17' and 20', thus leading to a more complicated installation.

Using $p_o$ to designate the steam pressure at the outlet from section 27 when the flow is 100%, which is to say when $Q_{cu}=Q_B$ (FIG. 2), this pressure will be x $p_o$ when the flow is x% and the turbine is in back-pressure operation (operating point on OB).

It may be deduced from the laws on fluid flow that the pressure $p_2$ at the outlet of partial casing 30 is not related to the pressure at the outlet of section 27 when $p_2/xp_o < 0.55$ and hence when $p_o > (1.8/x)p_2$.

Figure 2:
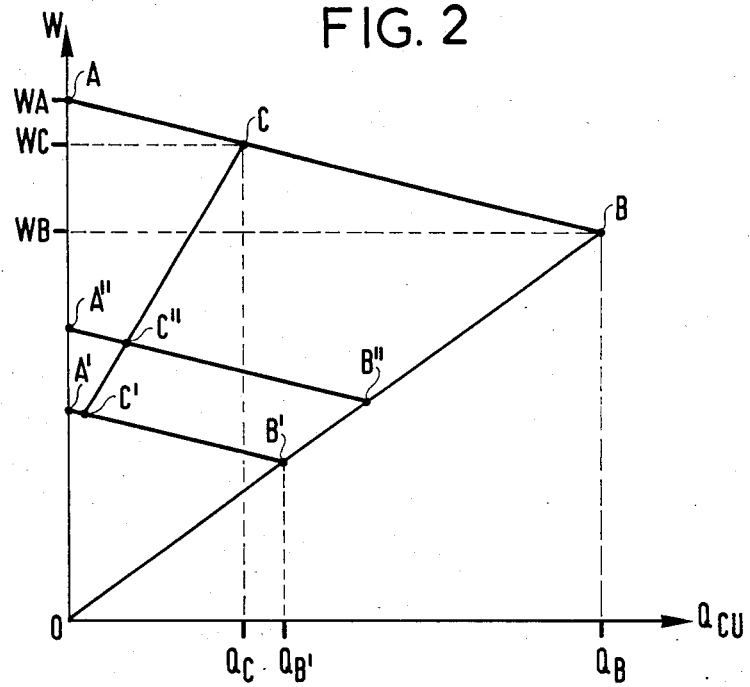
FIG. 2 diagrams the operation of the known turbine and of the turbine using the casing according to the invention.

To check that this inequality holds in all cases, let x be at its smallest possible value, ie. the value of the ratio of the minimum heat output in back-compression operation ($Q_{B'}$) to its maximum value ($Q_B$) (see FIG. 2).

Given the operation of exchanger 21, supplied with steam at pressure $p_2$, said pressure $p_2$ is very nearly the same as the saturation pressure corresponding to the rated temperature $t_2$ of the outgoing water for district heating.

The IP casing illustrated in FIG. 4 is part of a district heating turbine with an electrical output of 255 MW when operating on a 240 bar/540° C./540° C. supercritical cycle. The rate IP section inlet pressure is 50 bars and the pressure at the flow-splitting point $P_0$ is then 10 bars, $p_1$ being equal to 0.5 bar and $p_2$ to 1.2 bar.

The boiler's maximum power output $P_M$ is 550 MW.

This output can be broken down according to the following formula:

$$P_M = W + Q_{cu} + Q_{cond} + L,$$

where
W is the electrical power output,
$Q_{cu}$ is the heating output,
$Q_{cond}$, the power supplied to the condenser, and
L the losses.

These values are as follows when the turbine is operating with back-pressure or condensation:

|  | $P_M$ = W | + | $Q_{cu}$ | + | $Q_{cond}$ | + | L |
|---|---|---|---|---|---|---|---|
| back-pressure: | 550 MW = 211 | + | 320 | + | 9 | + | 10 |
| condensing: | 550 Mw = 255 | + | 0 | + | 285 | + | 10, | with $Q_B=320$ MW and $Q_{B'}=140$ MW, and x thus equal to 0.44.

The efficiency of the IP casing according to the invention is greater than that of the IP casing of FIG. 1. In fact, the efficiency of a turbine stage is known to be related to stage length.

An undivided flow of steam enables better lengthening of the stages.

For certain ranges of low-power, nonreheating turbine, the IP and HP expansion stages can be combined in a single casing.

Such a turbine would then consist merely of a casing according to the invention, followed by a LP section.

What is claimed is:

1. In a system designed for cogeneration of electric power and heat for district heating purposes including two district heating heat exchangers, (16, 21), a steam turbine having IP and LP sections, said steam turbine further comprising a stator (32), a rotor (31) rotating internally of said stator (32), said stator including a casing, blades carried by said rotor (31) rotating in said stator (32), said casing having an inlet steam admission (8') two exhausts (12' and 17') at different pressures $p_1$ and $p_2$ ($p_2 p_1$) feeding said LP section of the turbine, and two further exhausts (15', 20') at pressures $p_1$ and $p_2$ feeding said two district heating heat exchangers (16, 21), each of said heat exchangers providing substantially half of the heating output, the improvement wherein said IP section comprises a single flow section (27) and a double flow section (28), said double flow section (28) comprising two unsymmetrical partial flow section (29, 30), means supplying steam to said single flow section (27) from the steam inlet (8'), means for splitting the exhaust from said single flow section (27) into parallel flows of substantially equal steam flow rates, and for supplying said parallel flows to the inlets of respective unsymmetrical partial flow section (29, 30), and said flow-splitting point being located far enough from the two exhausts at pressure $p_2$ (17', 20') so that changes in flow rates have little or no effect on the steam pressure at said flow-splitting point.

2. The system according to claim 1, wherein the flow-splitting point for said IP section is selected such that for an in inlet pressure equal to its rated value, the pressure at the splitting point is greater than $1.8/x$ times the saturation pressure corresponding to the rated temperature of the water supplied to the district heating system, x being the ratio of the minimum heating output to its maximum back-pressure value.

3. The system according to claim 1, wherein the steam in the two partial flow sections (29, 30) flows in axially opposed directions.

4. The system according to claim 2, wherein the steam in the two partial flow sections (29, 30) flows in axially opposed directions.

* * * * *